(12) United States Patent
Vater et al.

(10) Patent No.: US 6,338,491 B1
(45) Date of Patent: Jan. 15, 2002

(54) ROTARY SHAFT SEAL

(75) Inventors: George R. Vater, Clarendon; Vladimir D. Shubinsky, Northbrook; Joachim Horsch, Lombard, all of IL (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 09/176,524

(22) Filed: Oct. 21, 1998

(51) Int. Cl.$^7$ .............................. F16J 15/16; F16J 15/54
(52) U.S. Cl. ................... 277/579; 277/582; 277/946
(58) Field of Search ................ 277/442, 447, 277/448, 496, 499, 579, 580, 582, 946

(56) References Cited

U.S. PATENT DOCUMENTS

| | | | |
|---|---|---|---|
| 3,122,505 A | | 2/1964 | Rulon-Miller et al. |
| 3,173,696 A | | 3/1965 | Reinhardt et al. |
| 3,612,545 A | * | 10/1971 | Storms .................... 277/26 |
| 3,632,121 A | * | 1/1972 | Wahlmark ................ 277/188 |
| 3,645,543 A | * | 2/1972 | Ksieski ..................... 277/58 |
| 3,698,054 A | * | 10/1972 | Prasse ...................... 277/215 |
| 3,716,245 A | * | 2/1973 | Turolla ..................... 277/188 |
| 3,917,290 A | * | 11/1975 | Geffroy ..................... 277/75 |
| 3,945,649 A | | 3/1976 | Nakamura |
| 4,185,838 A | | 1/1980 | Danner |
| 4,662,656 A | * | 5/1987 | Douglas et al. ............. 285/39 |
| 4,834,228 A | * | 5/1989 | Horsch .................. 192/85 AA |
| 4,981,303 A | | 1/1991 | Matsushima et al. |
| 5,046,718 A | | 9/1991 | Hay, II |
| 5,197,583 A | * | 3/1993 | Sakai et al. ............. 192/85 AA |
| 5,368,648 A | | 11/1994 | Sekizuka |
| 5,437,355 A | * | 8/1995 | Takagi et al. ........... 192/85 AA |
| 5,469,616 A | * | 11/1995 | Miyazaki et al. ....... 29/888.074 |
| 5,551,548 A | | 9/1996 | Shubinsky |
| 5,551,706 A | | 9/1996 | Barna et al. |
| 5,598,763 A | * | 2/1997 | Rao et al. .................... 277/235 |
| 5,934,685 A | * | 8/1999 | Danzer ........................ 277/499 |

* cited by examiner

*Primary Examiner*—Anthony Knight
*Assistant Examiner*—Vishal Patel
(74) *Attorney, Agent, or Firm*—A. N. Trausch

(57) ABSTRACT

An improved rotary shaft seal assembly is disclosed herein. The seal assembly is disclosed in combination with an example of transmission components with which it may be used. The assembly provides a rotary seal for fluid flow between a stationary cylinder and a shaft which rotates within the cylinder. The shaft includes a porting groove and seal grooves on each side of the porting groove. The seal grooves each include a cast iron and a polymeric (such as Teflon®) seal which form seals between the shaft and cylinder on both sides of the porting groove.

23 Claims, 3 Drawing Sheets

ROTARY SHAFT SEAL

FIELD OF THE INVENTION

The present invention is directed to an improved rotary shaft seal. In particular, the present invention is directed to a rotary shaft seal including a pair of seals used in a side-by-side arrangement wherein the seals have different coefficients of thermal expansion.

BACKGROUND OF THE INVENTION

For certain applications Teflon® seals have been used as rotary shaft seals. Teflon® provides a seal which can be located within a shaft groove to provide a seal between the shaft and cylinder within which it is rotating. Such a seal reduces the coefficient of sliding friction and results in wear prevention between the shaft, inside surface of the cylinder and seal material. In applications where the seal retains hydraulic fluid pressure on one side thereof, the pressure forces the seal against the cylinder, and the groove within which the seal is located. This force is caused by the pressure drop across the seal. Due to fluid pressurization the seal will typically remain stationary relative to the cylinder and rotate relative to the seal groove in the shaft. The disadvantage of plastic or polymeric seals such as Teflon® seals is that they have thermal coefficients of expansion which are high relative to the metal shafts and cylinders with which they are typically associated. Accordingly, until a Teflon® seal is heated to a steady state operating temperature, the seal will provide a relatively poor seal against fluid flow. In other words, the gap created between the seal, cylinder and shaft in cold or transient temperatures will allow fluid to flow around the seal and create an undesirable pressure drop as a result thereof.

Rotary seals have also been fabricated from cast iron which has the advantage of having a thermal expansion substantially the same as steel shafts with which they are typically associated. When located within a groove in a rotary shaft, the seal normally will rotate with the shaft when pressure is created on one side of the seal because the coefficient of friction of cast iron relative to steel is much greater than that of Teflon® relative to steel. However, as a result of the higher coefficient of friction than Teflon®, the cast iron seal will cause wear to the cylinder within which the shaft is rotating.

In view of the advantages and disadvantages of polymeric (e.g. Teflon®) and cast iron seals, it would be advantageous to selectively take advantage of the desirable performance characteristics of these seals to provide an improved rotary seal arrangement which is not subject to the undesirable performance characteristics of such seals.

SUMMARY OF THE INVENTION

One embodiment of the present invention provides a sealing arrangement for creating a seal between a first component such as a shaft having an exterior cylindrical surface and a second component such as a stationary hollow cylinder within which the shaft is located having an interior cylindrical surface. The arrangement includes a first circular seal fabricated from a first material having a coefficient of thermal expansion substantially greater than the first and second components, and a second circular seal fabricated from a second material having a coefficient of thermal expansion substantially the same as the first and second components. The first and second circular seals are positioned in a side-by-side relationship.

Another embodiment of the present invention provides a rotary seal arrangement. The arrangement includes a first component fabricated from metal and having an interior cylindrical surface, and a second component fabricated from metal and having an exterior cylindrical surface including a circumferential groove formed therein. A circular, polymeric seal is located within the groove, and a circular, metal seal is located adjacent to the polymeric seal within the groove. The second component is positioned relative to the first component such that the seals are adjacent to the interior cylindrical surface.

Another embodiment of the present invention provides a fluid porting arrangement for a transmission. The arrangement includes a stationary component fabricated from metal and having an interior cylindrical surface, a fluid port in the cylindrical surface and a fluid channel extending from an exterior surface of the stationary component to the fluid port. The arrangement also includes a rotary component rotatable within the stationary component, fabricated from metal. The rotary component has an exterior cylindrical surface including a circumferential porting groove aligned with the fluid port, a first circumferential groove formed on one side of the porting groove and a second circumferential groove formed on the opposite side of the porting groove. First and second circular, polymeric seals are located within the first and second circumferential grooves, respectively, and first and second circular, metal seals are located adjacent to the respective first and second circular polymeric seals in the respective first and second circumferential grooves.

DETAILED DESCRIPTION OF THE PREFERRED EMBODIMENTS

Figure 1:
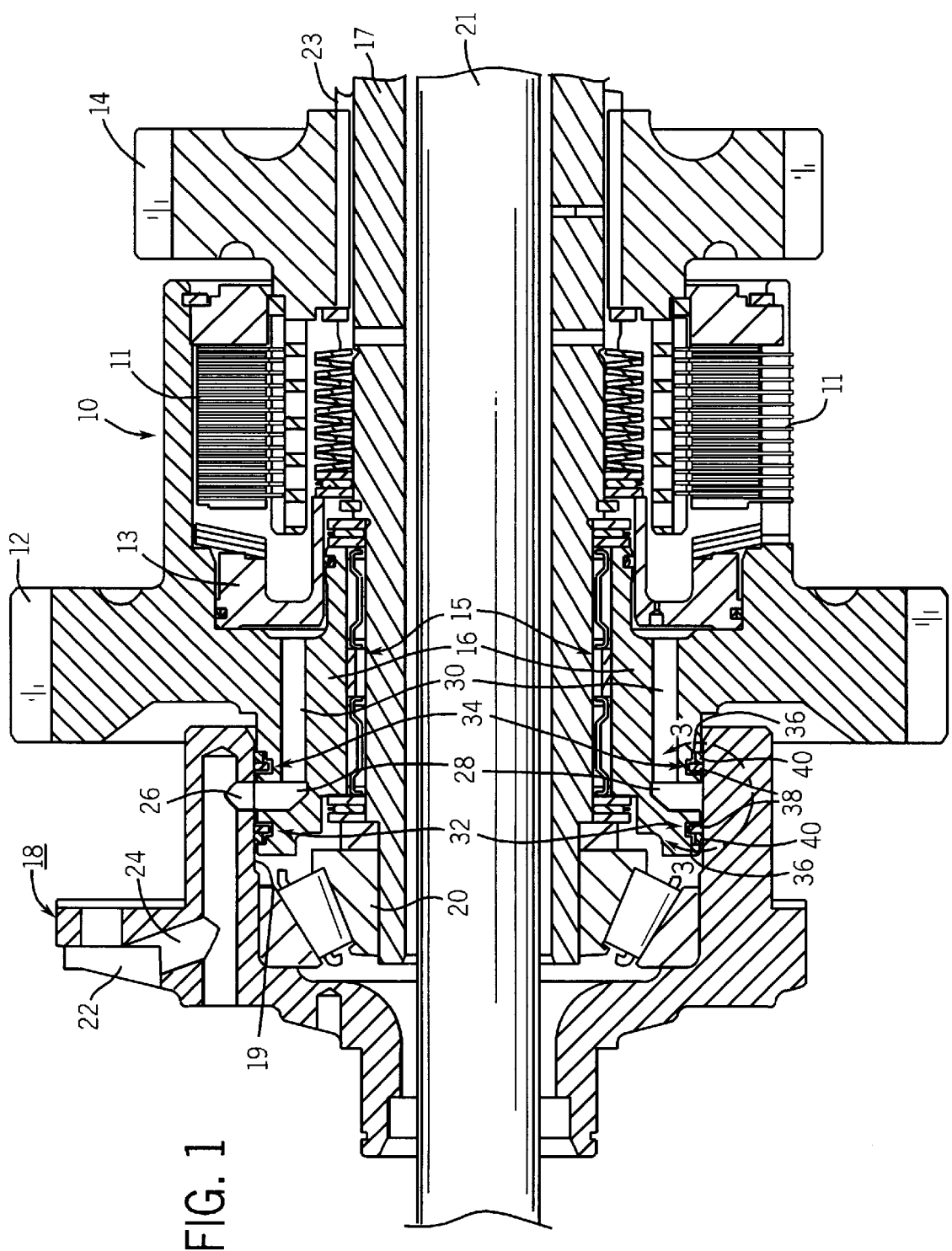
FIG. 1 is a sectional view of a drive assembly illustration the transmission portion and sealing arrangement.
Figure 2:
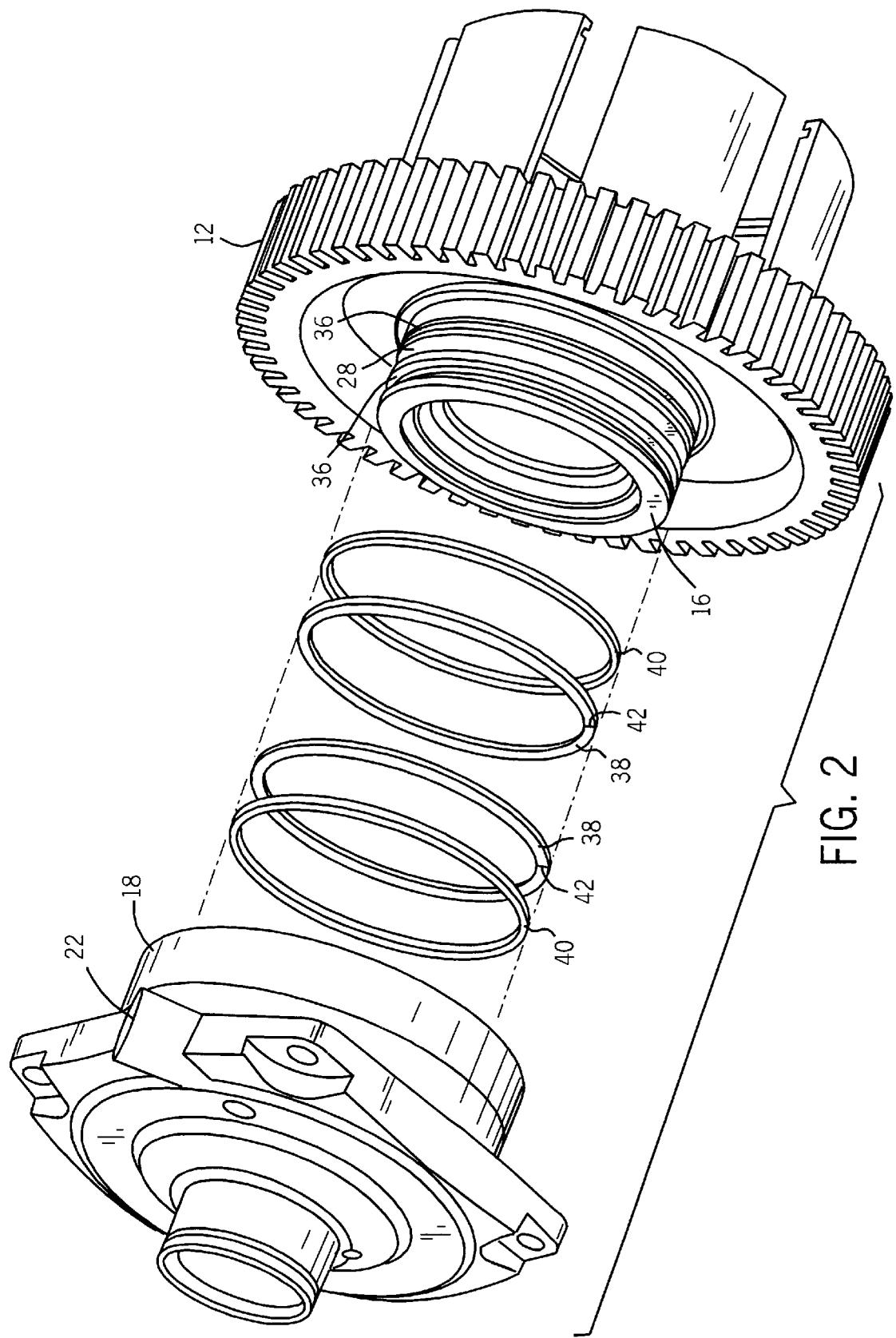
FIG. 2 illustrates an exploded perspective view of a portion of a transmission which utilizes one embodiment of the sealing arrangement of the present invention.

The present invention relates to creating a seal between a shaft and a cylindrical surface wherein the seal provides improved sealing properties under a range of temperature conditions. The preferred embodiment of the sealing arrangement will be described in the context of the drive assembly illustrated in FIG. 1. However, the sealing arrangement can be used with virtually any type of rotatable shaft. Referring to FIGS. 1 and 2, a hydraulically actuated clutch 10 transmits torque between a gear 12 and a gear 14. More specifically, gear 12 is formed on a hub or hollow shaft assembly 16, which is rotatably supported by a bearing arrangement 15. (By way of example, shaft assembly 16 may be integrally formed with gear 12.) A shaft 17 is rotatably supported relative to a bearing support 18 by an appropriate bearing such as a taper bearing 20 on one side of the opposite bearing support 19 not shown. Gear 14 is fixed to shaft 17 via an appropriate arrangement such as a spline 23. Accordingly, gear 14 can rotate relative to gear 12 when clutch assembly 10 is not activated, and both will rotate with the same speed when clutch assembly 10 is activated. (Inside of hollow shaft 17 there may be another shaft 21 which transmits auxiliary power through the drive assembly.)

Clutch assembly 10 includes a plurality of clutch plates 11 variously attached to shaft assembly 16 and shaft 17. Plates 11 are engaged by the operation pressurized hydraulic fluid on a piston 13. The fluid to activate clutch assembly 10 is supplied at a fitting 22 coupled to porting 24 in stationary bearing support 18. However, to activate clutch 10 with pressurized fluid applied to porting 24, the fluid must be provided through a sealed passageway from stationary bearing support 18 to rotatable hub assembly 16. Thus, porting 24 includes an outlet 26 which is aligned with a circumferential porting groove 28 in hub shaft 16. Groove 28 communicates with one or more hydraulic fluid channels 30 which are coupled to clutch assembly 10. Thus, fluid from inlet fitting 22 flows to clutch assembly 10 through porting 24, outlet 26, porting groove 28 and channels 30 to supply clutch assembly 10 with the hydraulic fluid necessary to move piston 13 such that plates 11 are engaged.

The sealing arrangement of the present embodiment is directed to providing a seal so that pressurized fluid supplied at outlet 26 can be pressurized and forced through groove 28 into channels 30 without leaking from between the interior cylindrical surface 19 of stationary bearing support 18 and the exterior cylindrical surface of hub shaft 16. Accordingly, circumferential seal assemblies 32 and 34 are provided between rotatable hub shaft 16 and stationary bearing support 18. Sealing assembly 32 prevents hydraulic fluid from flowing axially along the interface between hub shaft 16 and bearing support 18 to the left as shown in FIG. 1, and sealing assembly 34 prevents hydraulic fluid flow along the interface between hub shaft 16 and bearing support 18 to the right as shown in FIG. 1.

Figure 3:
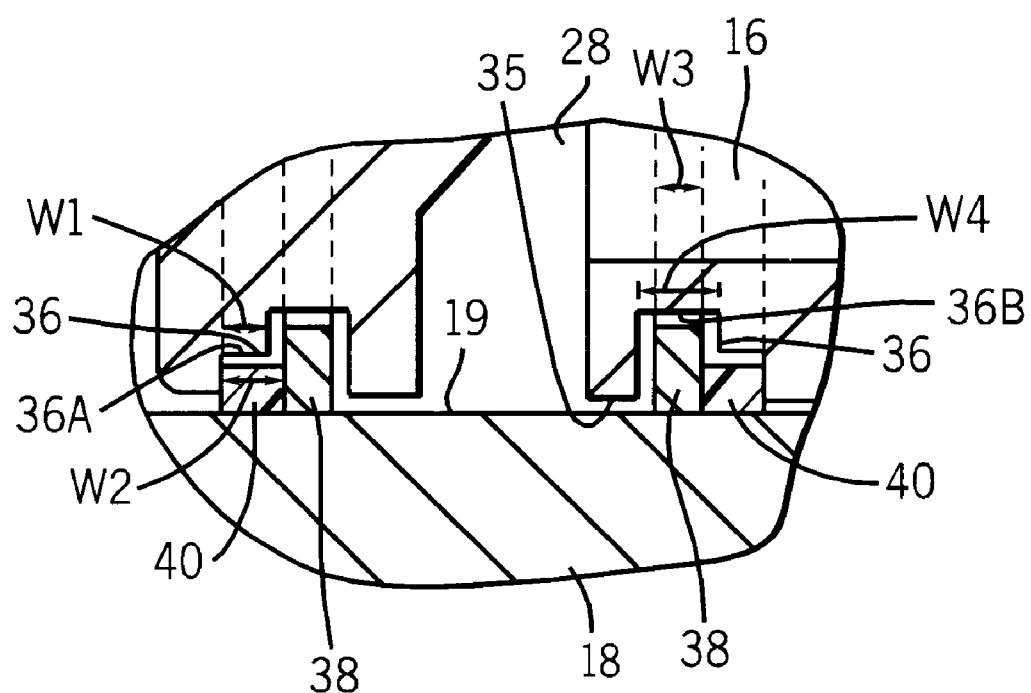
FIG. 3 is an enlarged, sectional view of the sealing arrangement in the area 3—3 of FIG. 1.

Turning more specifically to sealing assemblies 32 and 34, each assembly includes a stepped circumferential groove 36 formed in rotating hub 16. As best seen in FIG. 3, the stepped circumferential groove 36 includes a first diameter portion 36A and a second diameter portion 36B. A metallic circumferential sealing ring 38 (e.g. cast iron seal) is positioned in the second diameter portion 36B of the stepped groove 36. A polymer circumferential sealing ring 40 (e.g. Teflon® seal) is positioned in the first diameter portion 36A of the stepped groove 36. The first diameter portion 36A has an axial width of W1. The second diameter portion 36B has an axial width of W4. Accordingly, when hub 16 rotates relative to bearing support 18, seals 38 and 40 interact with stepped grooves 36 and the inner surface of bearing support 18 to maintain a sealed channel for fluid communication between outlet port 26 and porting groove 28. By way of modification, stepped grooves 36 could be formed in the inner surface 19 of bearing support 18 wherein seals 38 and 40 would interact with the stepped grooves 36 and the corresponding exterior surface of rotating hub 16.

Seals 38 are preferably fabricated from a material which has a coefficient of thermal expansion (i.e. linear expansion per unit length per degree of temperature change) substantially the same as the shaft and sealing surface they are used with. Thus, in the present application where bearing support 18 may be cast iron or steel and hub shaft 16 is steel, seals 38 would be fabricated from an appropriate iron-based metal such as cast iron. Thus, when hub shaft 16 and support 18 are relatively cold (i.e. system start up) and the temperature of hub shaft 16 and support 18 increases as the system is heated to its steady state temperature, seals 38 expand with hub shaft 16 and support 18 to provide relatively good sealing between hub shaft 16 and support 18 throughout the full range of temperatures between the starting temperature and steady state temperature. Thus, seals 38 do not expand in such a way to adversely interfere with the associated grooves 36 or surface 19.

Preferably metal seals 38 are circular and have a generally rectangular cross section, and as seen in FIG. 3, have an axial width W3, which is less than the axial width W4 of the second diameter portion 36B of the stepped groove 36. Seals 38 are positioned within their corresponding stepped grooves 36 by opening the seal at a hook joint 42 and reconnecting hook joint 42 after the seal 38 expands and is located within its associated groove 36.

Seals 40 are preferably fabricated from a material which has a coefficient of thermal expansion greater than the shaft and sealing surface with which they are used. Thus, in the present application where bearing support 18 may be cast iron or steel and hub shaft 16 is steel, seals 40 would be fabricated from an appropriate polymeric material such as Teflon®. Thus, when hub shaft 16 and support 18 are relatively cold (i.e. system start up) and the temperature of hub shaft 16 and support 18 increases as the system is heated to its steady state temperature, seals 40 expand at a rate greater than that of hub shaft 16 and support 18 to provide a seal which is better than that provided by seals 38 alone when the system reaches its steady state operating temperature. Furthermore, depending upon the particular material used for seals 40, the compressibility of seals 40 may be substantially higher than that of seals 38. This allows the fluid pressure applied to seals 38 to deform seals 40 in such a way that the seal between hub shaft 16 and support 18 is further improved.

Preferably, polymeric seals 40 are circular and have a generally rectangular cross section, and as seen in FIG. 3, have an axial width W2, which is less than the axial width W1 of the first diameter portion 36A of the stepped groove 36. Seals 40 are positioned within their corresponding stepped grooves 36 by deforming (i.e. stretching) the seal to locate it within its associated groove 36.

While particular embodiments of the present invention have been illustrated and described herein, the present invention should not be limited to such illustrations and descriptions. It should be apparent that changes and modifications may be incorporated and embodied as part of the present invention within the scope of the following claims.

For example, other materials may be used for seals 38 which have a coefficient of thermal expansion greater than about $1.0 \times 10^{-6}$ in/° F. and less than about $3.0 \times 10^{-5}$ in/° F., including all ranges subsumed therein. Preferably, the materials would have a coefficient of thermal expansion greater than about $2.0 \times 10^{-6}$ in/° F. and less than about $9.0 \times 10^{-6}$ in/° F., and most preferably, greater than about $5.5 \times 10^{-6}$ in/° F. and less than about $7.5 \times 10^{-6}$ in/° F., including all ranges subsumed therein.

By way of another example, other materials may be used for seals 38 which have a coefficient of thermal expansion greater than about $3.0 \times 10^{-5}$ in/° F. and less than about $4.0 \times 10^{-4}$ in/° F., including all ranges subsumed therein. Preferably, the materials would have a coefficient of thermal expansion greater than about $4.0 \times 10^{-5}$ in/° F. and less than about $1.0 \times 10^{-4}$ in/° F., and most preferably, greater than about $6.0 \times 10^{-5}$ in/° F. and less than about $9.0 \times 10^{-5}$ in/° F., including all ranges subsumed therein. These materials may include thermosets or thermoplastics and include homopolymers, copolymers (including terpolymers), miscible blends and immiscible blends, all of which can be substituted or unsubstituted, straight chained or branched. Also, the material can include alkylenes as well as materials comprising polyimides, polyamides, silicone and elastomeric units. Preferably, the material selected for seals 40 is from the group consisting of a polytetrafluoroethylene-silicate-metal blend (e.g., Rulon®), a polyamide-imide (e.g., Torlon®) and a polytetrafluoroethylene (e.g., Teflon®), with polytetrafluoroethylene (Teflon®) typically being the most preferred (discussed above).

Additionally, it is within the scope of this invention for seals 40 to comprise less than about 25 percent by weight, and preferably, less than about 10 percent by weight of at least one additive selected from the group consisting of talc, mica, asbestos, silica, zinc, cadmium, lead and oxides thereof, molybdenum disulfide, tungsten disulfide, alumina, zirconia, titanium oxide, cupric oxide and boron nitride. The polymeric material employed in this invention is commercially available from, for example, DuPont and Amoco.

By way of further example, seals 38 and 40 may be one piece or may comprise a plurality of pieces. Thus, seals 38 and 40 can merely be adjacent to one another or adjacent to one another and physically connected. Seals 38 and 40 may be connected to one another by any conventional means known in the art. For example, seals 38 and 40 may be fastened together with rivets, screws, tension clamps, nuts and bolts or adhesives. Depending on the application, the rivets, screws, tension clamps and nuts and bolts could be recessed into the seals.

Furthermore, the seal arrangement of the present invention may be used in a broad range of mechanical systems such as oil pumps, water pumps, gas engines, automobile rear-end systems and transmissions for a variety of motor-vehicles, including off-highway vehicles. The seal arrangement may also be used with other fluids to the extent such fluids do not chemically react with the materials used for the seals. Therefore, the sealing arrangement may be used in the presence of, for example, lubricating oils such as motor oils, transmission fluids, water and water mixed with conventional glycols like diethylene glycol.

What is claimed is:

1. A sealing arrangement for creating a rotary seal between a first rotating shaft having an exterior cylindrical surface and a second stationary support having an interior cylindrical surface within which the rotating shaft is located, one of the first rotating shaft and second stationary support having a stepped circumferential groove having a first diameter portion and a second diameter portion, the arrangement comprising:

a first circular seal fabricated from a first material having a coefficient of thermal expansion substantially greater than the first rotating shaft and the second stationary support and positioned in the first diameter portion; and a second circular seal fabricated from a second material having a coefficient of thermal expansion substantially the same as at least the first rotating shaft and positioned in the second diameter portion, wherein the first and second circular seals are positioned in a side-by-side relationship within the stepped circumferential groove.

2. The arrangement of claim 1, wherein the first circular seal is fabricated from a polymeric material.

3. The arrangement of claim 2, wherein the polymeric material is Polytertrafluoroethylene.

4. The arrangement of claim 1, wherein the second circular seal is fabricated from a cast iron.

5. The arrangement of claim 4, wherein the cast iron is phosphate coated cast iron.

6. The arrangement of claim 1 wherein the stepped circumferential groove is positioned on the exterior cylindrical surface of the first rotating shaft.

7. The arrangement of claim 1, wherein stepped circumferential groove is positioned on the interior cylindrical surface of the second stationary support.

8. A rotary seal arrangement comprising:

a first component fabricated from a first metal and having a first cylindrical surface;

a second component fabricated from a second metal and having a second cylindrical surface including a stepped circumferential groove formed therein, the stepped groove having a first diameter portion and a second diameter portion;

a circular, polymeric seal located within the first diameter portion of the stepped groove; and a circular, metal seal located adjacent to the polymeric seal within the second diameter portion of the stepped groove, wherein the second component is positioned relative to the first component such that the seals are adjacent to one of the first cylindrical surface and the second cylindrical surface.

9. The arrangement of claim 8, wherein the first and second metals have substantially similar coefficients of thermal expansion.

10. The arrangement of claim 8, wherein the first diameter portion of the stepped groove has a diameter that is greater than the second diameter portion.

11. The arrangement of claim 8, wherein the polymeric seal has a coefficient of thermal expansion greater than the first and second metals.

12. The arrangement of claim 8, wherein first diameter portion of the stepped groove has a first axial width and the polymeric seal has a second axial width that is greater than the first axial width of the first diameter portion.

13. The arrangement of claim 8, wherein the metal seal has a third axial width and the second diameter portion of the stepped groove has a fourth axial width that is greater than the third axial width of the metal seal.

14. The arrangement of claim 8, wherein the first component is a stationary support and the second component is a rotatable shaft and the first diameter portion is greater than the second diameter portion.

15. The arrangement of claim 8, wherein the first component is a rotatable shaft and the second component is a stationary support and the second diameter portion is greater than the first diameter portion.

16. A fluid porting arrangement for a mechanical drive, the arrangement comprising:

a stationary component fabricated from a first metal and having an interior cylindrical surface, a fluid port in the interior cylindrical surface and a fluid channel extending from an exterior of the stationary component to the fluid port;

a rotary component rotatable within the stationary component, fabricated from a second metal, and having an exterior cylindrical surface including a circumferential porting groove aligned with the fluid port, a first stepped circumferential groove formed on one side of the porting groove and a second stepped circumferential groove formed on the opposite side of the porting groove on the exterior cylindrical surface, each first and second stepped circumferential groove having a first diameter portion and a second diameter portion;

first and second circular, polymeric seals located within the first diameter portion of the first and second stepped circumferential grooves, respectively; and first and second circular, metal seals located adjacent to the respective first and second circular polymeric seals in the second diameter portion of the respective first and second stepped circumferential grooves.

17. The arrangement of claim 16, wherein the rotary component is a drive shaft fabricated from steel, and the metal seals are located between the porting groove and the polymeric seals.

18. The arrangement of claim 16, wherein the polymeric seals have a coefficient of thermal expansion greater than the first and second metals.

19. The arrangement of claim 18, wherein the polymeric seals are Polytetrafluoroethylene.

20. The arrangement of claim 16, wherein the first diameter portion of the stepped groove has a diameter that is greater than the second diameter portion.

21. The arrangement of claim 16, wherein the first diameter portion of the stepped groove has a first axial width and the polymeric seal has a second axial width that is greater than the first axial width of the first diameter portion.

22. The arrangement of claim 21, wherein the metal seals have a third axial width and the second diameter portion of the stepped groove has a fourth axial width that is greater than the third axial width of the metal seal.

23. The arrangement of claim 16, wherein the metal seals each include a hook joint to permit positioning of the seals in their respective stepped circumferential groove.

* * * * *